(12) United States Patent
Hecht

(10) Patent No.: US 10,391,566 B2
(45) Date of Patent: Aug. 27, 2019

(54) MILLING KIT INCLUDING BORE-LESS INDEXABLE INSERT AND POSITIONING TOOL HAVING AN INSERT HOLDING SURFACE

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 37 days.

(21) Appl. No.: 15/784,300

(22) Filed: Oct. 16, 2017

(65) Prior Publication Data

US 2019/0111502 A1    Apr. 18, 2019

(51) Int. Cl.
| | |
|---|---|
| *B23C 5/22* | (2006.01) |
| *B25B 11/00* | (2006.01) |
| *B25B 27/14* | (2006.01) |
| *B25F 1/00* | (2006.01) |
| *B25B 23/12* | (2006.01) |

(52) U.S. Cl.
CPC .............. *B23C 5/22* (2013.01); *B25B 11/002* (2013.01); *B25B 23/12* (2013.01); *B25B 27/14* (2013.01); *B25F 1/00* (2013.01); *B23C 2200/0483* (2013.01); *B23C 2210/16* (2013.01); *B23C 2210/163* (2013.01); *B23C 2210/202* (2013.01); *B23C 2240/24* (2013.01); *B23C 2245/00* (2013.01); *B23C 2250/12* (2013.01)

(58) Field of Classification Search
CPC .............. B23C 5/22; B23C 2200/0483; B23C 2210/16; B23C 2240/24; B25B 27/14; B25B 11/002; B25F 1/00
See application file for complete search history.

(56) References Cited

U.S. PATENT DOCUMENTS

| 2,260,055 A | 10/1941 | Reardon |
| 2,300,308 A | 10/1942 | Ojalvo |

(Continued)

FOREIGN PATENT DOCUMENTS

DE    102008025699 A1    12/2009

OTHER PUBLICATIONS

International Search Report dated Jan. 11, 2019, issued in PCT counterpart application (No. PCT/IL2018/051035).

(Continued)

*Primary Examiner* — Sara Addisu
(74) *Attorney, Agent, or Firm* — Womble Bond Dickinson (US) LLP

(57) ABSTRACT

A positioning tool is configured for retaining an undersized, bore-less indexable cutting insert. The cutting insert may have a triangular or trigonal shape. The positioning tool has an outwardly facing insert retaining surface which has an elongated shape which corresponds to a shape of a side of the undersized cutting insert. The positioning tool is configured to retain the cutting insert using magnetic force, electrostatic force and/or adhesive force. A milling kit may include such a positioning tool, along with one or more such undersized cutting inserts. The milling kit may optionally also include a milling tool having one or more insert pockets configured to accommodate such cutting inserts, and may further optionally include one or more clamping screws configured to clampingly and externally secure such inserts in the pocket without passing through the inserts.

24 Claims, 4 Drawing Sheets

(56) References Cited

U.S. PATENT DOCUMENTS

| | | | |
|---|---|---|---|
| 2,688,991 A | 9/1954 | Doyle | |
| 3,884,282 A | 5/1975 | Dobrosielski | |
| 3,989,077 A * | 11/1976 | Humbert | B27G 13/04 144/230 |
| 4,658,875 A * | 4/1987 | Grabovac | B27G 13/04 144/117.1 |
| 5,456,300 A * | 10/1995 | Rosenkranz | B27G 13/04 144/174 |
| 5,901,622 A * | 5/1999 | Sweeny | B25B 9/00 7/165 |
| 6,164,172 A * | 12/2000 | Huang | B25B 9/00 7/165 |
| 7,341,433 B2 * | 3/2008 | Berger | B23B 27/04 407/114 |
| 8,621,961 B2 * | 1/2014 | Burch | B25B 15/02 7/107 |
| 2003/0110909 A1 * | 6/2003 | Liou | B25B 19/00 81/466 |
| 2012/0222524 A1 * | 9/2012 | Floyd | B25B 13/461 81/60 |
| 2012/0321399 A1 * | 12/2012 | Wuerfels | B23C 5/2295 407/69 |
| 2014/0212228 A1 * | 7/2014 | Horiike | B23C 5/109 407/42 |
| 2014/0230612 A1 * | 8/2014 | Sun | B25B 23/12 81/177.2 |

OTHER PUBLICATIONS

Written Opinion dated Jan. 11, 2019, issued in PCT counterpart application (No. PCT/IL2018/051035).

* cited by examiner

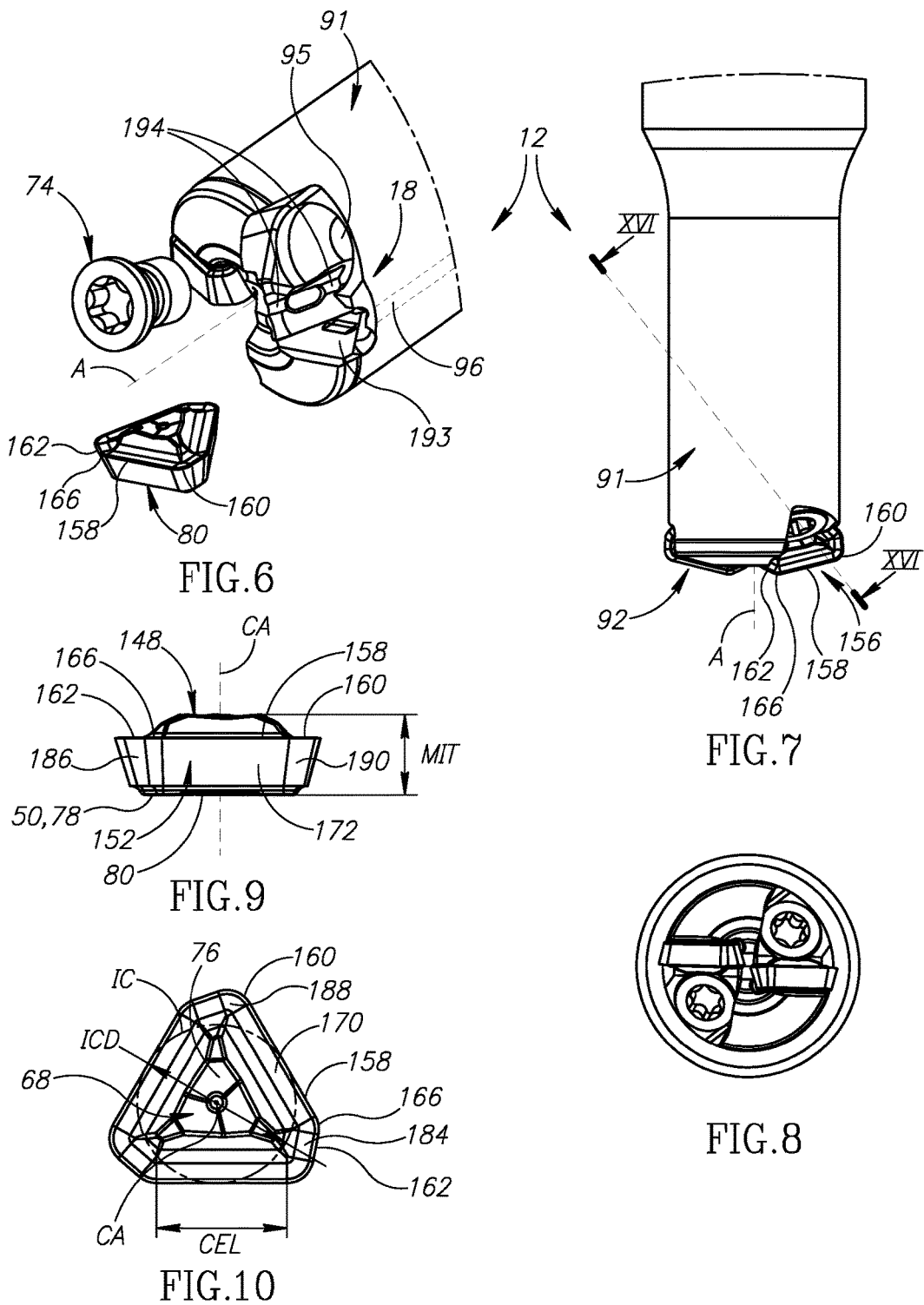

MILLING KIT INCLUDING BORE-LESS INDEXABLE INSERT AND POSITIONING TOOL HAVING AN INSERT HOLDING SURFACE

FIELD OF THE INVENTION

The subject matter of the present application relates to milling tools. Specifically, it relates to tiny milling tools with undersized indexable triangular or trigonal milling inserts which are devoid of a through bore for clamping the insert.

BACKGROUND OF THE INVENTION

Generally speaking, replaceable/expendable inserts secured in a reusable steel body are preferred to one-piece cutting tools in which the tool body has built-in sharp cutting edges. One-piece tools have been dominant at a low end of the tool-size/diameter scale. Specifically, this is true under a certain insert size, where it becomes impractical (or even impossible) to use replaceable inserts because they cannot be secured in a pocket via a clamping screw which normally passes through a clamping bore in the insert. The main reason for this, is that under a certain size, the clamping screws (and specifically the heads thereof) become too small for standard drivers or wrenches.

Another, and perhaps more important problem with replaceable/expendable indexable inserts is that it is very difficult to handle such small, barely-visible units by hand. The milling kit of the present application, and specifically the magnetic positioning tool, overcomes these problems and offers a milling tool with replaceable undersized milling inserts.

SUMMARY OF THE INVENTION

In accordance with a first aspect of the subject matter of the present application there is provided a positioning tool configured to hold and/or retain an undersized, bore-less indexable cutting insert, the positioning tool comprising an outwardly facing insert holding surface having an elongated shape,
wherein,
the shape of the insert holding surface corresponds to a shape of a side of the cutting insert.

In accordance with a second aspect of the subject matter of the present application there is further provided a milling kit which includes the positioning tool and an undersized, bore-less cutting insert.

In accordance with a third aspect of the subject matter of the present application there is further provided a milling kit which includes a milling tool having an insert pocket, an undersized, bore-less indexable cutting insert externally secured in the pocket via a clamping screw and the positioning tool.

In accordance with a fourth aspect of the subject matter of the present application there is further provided a method of replacing an undersized insert (usually because all cutting edges have become worn) with the magnetic positioning tool can include the following steps:
 a. Attaching the insert holding surface to any part of the undersized insert;
 b. Unfastening the screw to unclamp, or release, the undersized insert;
 c. Pulling the insert out of the pocket, detaching the insert from the insert holding surface and discarding it;
 d. Attaching the insert holding surface to a non-used relief surface of a replacement cutting insert.
 e. Inserting the replacement insert into the pocket and fastening the screw.

In accordance with a fifth aspect of the subject matter of the present application there is further provided a method of indexing an undersized insert (usually due to a worn cutting edge) with the magnetic positioning tool can include the following steps:
 a. Attaching the magnetic holding surface to an exposed, or accessible, main relief surface associated with an operative, usually worn, main cutting edge;
 b. unscrewing the screw to unclamp, or release, the undersized insert;
 c. attaching the magnetic tool to the insert;
 d. removing the insert from the pocket and indexing it such that a non-used main relief surface is attached to the insert holding surface;
 e. Inserting the undersized insert 14 into the pocket 18 and fastening the screw.

Any of the following features, either alone or in combination, may be applicable to any of the above aspects of the subject matter of the application:

The positioning tool may have a magnetic or magnetized insert holding surface which is configured to magnetically retain the insert. In some embodiments, the positioning tool may comprise a natural magnet while in other embodiments the positioning tool may comprise an electromagnet.

The positioning tool may have an electrostatic insert holding surface which is configured to electrostatically retain the insert.

The positioning tool may have a sticky insert holding surface to which the insert may temporarily adhere, upon contact.

The insert holding surface is elongated in an elongation direction and the positioning tool can further include opposite, enlarged gripping surfaces which extend in the elongation direction (ED) and are configured to provide grip and orientation indication when an operator holds the positioning tool.

The insert holding surface can have two opposite major edges extending in the elongation direction and two, shorter, minor edges extending between the major edges.

The tool body is elongated in an axial direction extending away from the positioning head, and the insert holding surface is the outward-most surface which protrudes axially outwardly from the positioning head.

The undersized insert is triangular or trigonal, and the insert holding surface is configured to engage one of three main relief surfaces of the undersized insert.

The insert holding surface can include opposite identical major edges which range between 1.8 and 4.2 mm.

The insert holding surface has opposite minor edges which connect the opposite major edges and range between 1.1 and 2.4 mm.

The positioning tool can be modular, and the rear tool end of the tool body can be configured to be selectively attached to and detached from, a driving tool.

The positioning tool can have an elastic sleeve rigidly connected to the positioning head.

The tool body is elongated in an axial direction extending away from the positioning head; the insert holding surface is elongated in an elongation direction; and in a view along the axial direction, the insert holding surface has a smaller footprint than a footprint of the tool body.

The positioning head can include two head surfaces which extend and diverge, rearwardly away from the insert holding surface.

The positioning tool can further include a non-ferromagnetic, non-magnetic holding portion rigidly connected to the tool body, and configured for enabling grip and applying torque transfer.

The cutting insert has only three main cutting edges and an inscribed circle which tangentially contacts all three main cutting edges.

The inscribed circle can an inscribed circle diameter which ranges between 2.5 mm and 3.8 mm.

The inscribed circle can have an inscribed circle diameter which ranges between 2.5 mm and 3.2 mm.

A shape of the insert holding surface corresponds to a shape of a main relief surface of the cutting insert.

The cutting insert includes:

opposite insert top and bottom surfaces and an insert peripheral surface which extends therebetween;

a symmetry central axis passing through the top and bottom surfaces; and a maximum insert thickness, measured along the symmetry central axis, and ranging between 1 mm and 2.5 mm.

The milling tool can include a fluid channel which opens out to the at least one insert pocket at a fluid outlet.

The cutting insert can have a main cutting edge having a main cutting edge length which ranges between 2 mm and 4 mm.

The cutting insert includes a symmetry central axis passing through the top and bottom surfaces, around which the cutting insert has 120 degree rotational symmetry.

BRIEF DESCRIPTION OF THE DRAWINGS

For a better understanding of the subject matter of the present application and to show how the same may be carried out in practice, reference will now be made to the accompanying drawings, in which:

FIG. 6 is an exploded isometric view of a first embodiment of undersized inserts and a milling tool;

FIG. 7 is a side view of the milling tool of FIG. 6;

FIG. 8 is an axial view of the milling tool of FIG. 6;

FIG. 9 is a side view of the undersized insert of FIG. 6;

FIG. 10 is a plan view of an insert top surface of the undersized insert of FIG. 6;

Figures 1, 2:
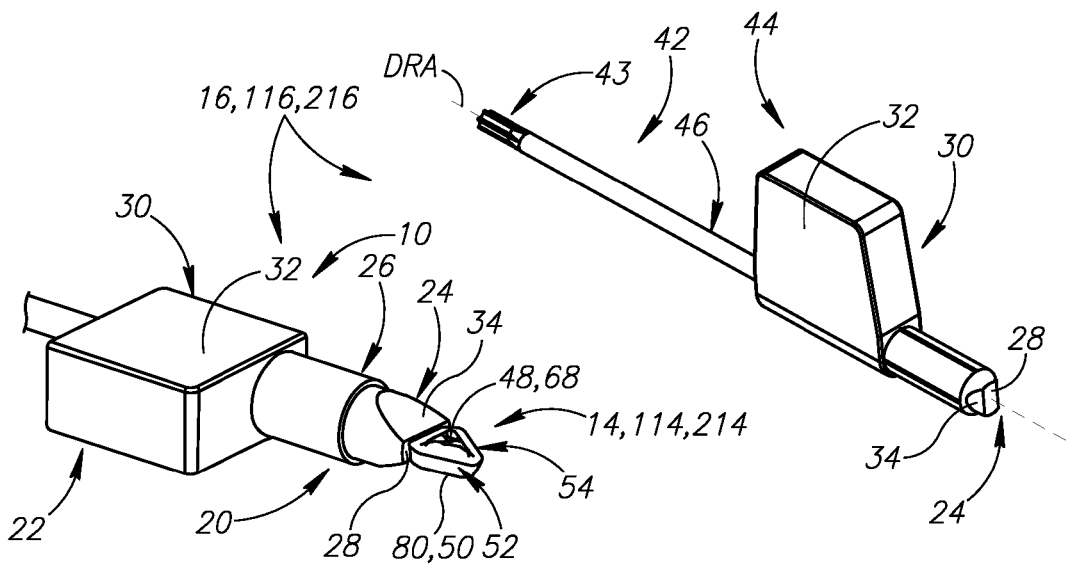
FIG. 1 is an isometric view of a milling kit which includes an undersized insert and a positioning tool having an insert holding surface.
FIG. 2 is an isometric view of first and/or second embodiments of a positioning tool with driving means.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is drawn to FIGS. 1 and 2. A new milling kit 10 for a milling tool 12 (see FIGS. 6 & 7) includes one or more undersized, bore-less indexable milling inserts 14 and a positioning tool 16 to manipulate the inserts into and out of a pocket 18 of the milling tool 12.

The undersized insert 14 is indexable, bore-less, positive and triangular or trigonal. This insert 14 is secured in pockets 18 in the milling tool 12. The milling tool 12 has a longitudinal rotation axis A.

The word 'undersized' is used in a sense that describes cutting inserts 14 which are smaller than currently available replaceable 'one-piece' (i.e., not brazed, or made of two or more major portions) inserts which include a clamping bore. Stated differently, these undersized inserts 14 are so small, that they may become engulfed, or disappear from sight, between two fingertips, or finger cushions. These indexable inserts 14, and especially cutting edges thereof, are difficult to see with the naked eye in many lighting conditions. This is especially problematic when differentiating between new, unused cutting edges, and worn-out cutting edges. These physical properties lead to substantial difficulties for an operator handling these tools and inserts.

For present purposes, an insert is said to be "undersized" if it meets one or more predetermined size and geometry criteria, as will be further explained below.

The milling tool 12 is therefore provided with the positioning tool 16 (FIGS. 1-5). Indexing, installing or replacing these undersized inserts 14 is done at least with the positioning tool 16, and optimally—using the positioning tool 16 in combination with two fingers as will be further explained below.

The positioning tool 16 is configured to hold the undersized inserts 14, such that the cutting edges are visible (as opposed to holding the inserts 14 by hand, where the cutting edges can literally become invisible). Furthermore, the positioning tool 16 is configured to hold the insert 14 in a specific orientation, for accurately securing and positioning of the insert 14 in the pocket 18 and for accurately identifying worn cutting edges. For example, if a cutting edge becomes worn, the operator will retain the insert 14 via the relief surface associated with the insert's 14 worn cutting edge with the positioning tool 16, take the insert 14 out of the pocket 18, change the insert's 14 orientation with respect to the positioning tool 16, and then put the insert 14 back in the pocket 18 in the desired orientation (i.e., unused cutting edge facing outwardly).

Most operators would find it very difficult, if not impossible, to position, hold and index these undersized inserts 14 without the positioning tool 16.

According to one embodiment of the subject matter of the present application, the positioning tool 16 is therefore provided as a part of a milling kit 10 which includes the positioning tool 16, the milling tool 12 and one or more undersized inserts 14. According to another embodiment, the milling kit 10 includes only the positioning tool 16 and the undersized inserts 14.

Attention is drawn to FIGS. 1-2. The positioning tool 16 has opposite front and rear tool ends 20, 22. At the front tool end 20, the positioning tool 16 has a positioning head 24 which has a unitary, one-piece construction. At the rear tool end 22, the positioning tool 16 includes a tool body 26 which is rigidly and permanently attached to the positioning head 24. The tool body 26 can be made of plastic, or a suitable non-magnetized, non-ferromagnetic material.

The positioning head 24 has an elongated, preferably cylindrical shape. The positioning head 24 has an insert holding surface 28 which is located at the front tool end 20 and faces axially outwardly.

For present purposes, an "insert holding surface" is one which retains an undersized insert by applying an attractive force to surfaces of the insert. The insert holding surface relies on attractive forces such as a magnetic force or an electrostatic force, to retain the insert. Alternatively, the insert holding surface can be a sticky surface which temporary adheres to the insert on contact.

The insert holding surface 28 protrudes axially outwardly from the positioning head 24. In other words, the insert holding surface 28 is the outer-most portion of the positioning head 24 in an axial direction thereof. This is advantageous to better hold the insert 14, with no interference, and, to better define and view its orientation. The insert holding surface 28 is configured to engage and hold the undersized inserts 14. Therefore, the insert holding surface 28 has an asymmetric shape which is configured to match, or correspond to, a shape of a side, or a peripheral side, of the undersized inset 14 (generally, most inserts have elongated sides, or peripheral sides). Specifically, at least in a plan view of a relief surface of an insert (this, contrary to a view of a rake surface of an insert, where symmetric shapes are rather common), the insert has an elongated shape.

In a preferred embodiment, further described below, the attractive force is magnetic. Accordingly, the positioning tool 16 is a magnetic positioning tool 16 having a positioning head 24 provided with a magnetic insert holding surface 28. In such an embodiment, the head 24 and insert holding surface 28 generate magnetic fields, either being formed from a naturally magnetic material, or a ferromagnetic material. Additionally, in some embodiments, the magnetic positioning tool 16 may comprise an electromagnet.

Figure 3:
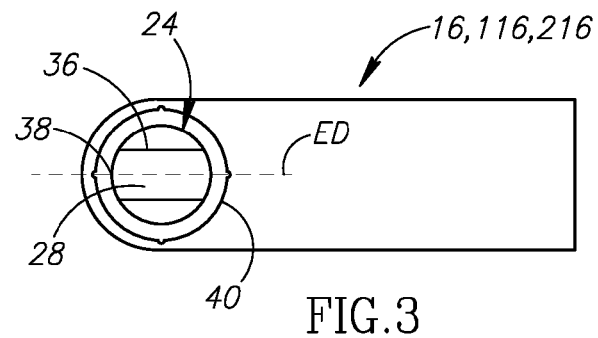
FIG. 3 is an axial view of the magnetic tool of FIG. 2.
Figure 4:
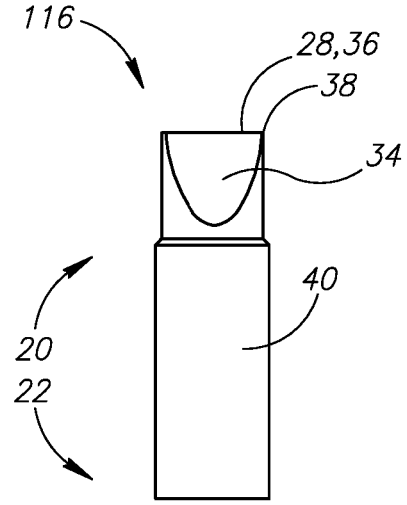
FIG. 4 is a side view of a first embodiment of the positioning tool of FIG. 2.
Figure 5:
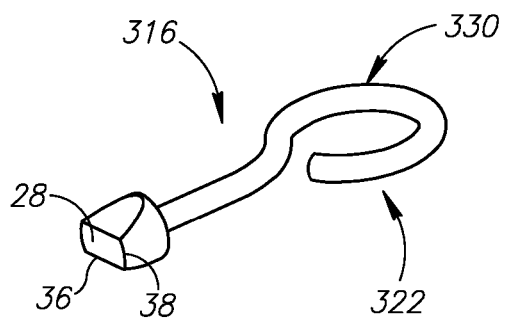
FIG. 5 is a third embodiment of the positioning tool without driving means.

Attention is drawn to FIG. 3. In a plan view, the magnetic insert holding surface 28 has a peripheral edge which has a closed, elongated shape, which defines an elongation direction ED. In other words, in a first direction (elongation direction ED), the shape of the magnetic insert holding surface 28 has a maximum dimension which is larger than a maximum dimension in a second direction, perpendicular to the elongation direction ED. The shape of the magnetic insert holding surface 28 corresponds to, or matches a side of the undersized inserts 14. Specifically, in an attached position (when the magnetic insert holding surface 28 is in contact a side of the undersized inset) the undersized insert 14 is aligned with, and corresponds to, the elongation direction ED (as seen in FIG. 3) due to the attractive forces. The word 'corresponds' is used in the sense that indicates similarities in geometry (e.g., if one shape is a rectangle, the corresponding shape will not be round) between the shape of the magnetic insert holding surface 28, and the shape of a side of the undersized insert 14. This is advantageous, since when the magnetic insert holding surface 28 is brought close enough to any side, or side peripheral surface, or relief surface 82, of the undersized insert 14, magnetic pulling forces (mostly within boundaries of the magnetic insert holding surface 28) can alter the insert's 14 orientation to match, or correspond to that of the magnetic insert holding surface 28.

Furthermore, the magnetic positioning tool 16 includes a holding portion 30 which includes opposite gripping surfaces 32 which provide the operator grip and enable easy application of torque onto the magnetic positioning tool 16. The holding portion 30 is located rearwardly away from the magnetic insert holding surface 28. The opposite gripping surfaces 32 extend in the elongation direction ED. The gripping surfaces 32 can be parallel to the elongation direction ED. This feature is advantageous, since the operator can easily establish, or readily deduce, the orientation of the magnetic insert holding surface 28, and subsequently— the orientation of the undersized insert 14.

The magnetic insert holding surface 28 has the same, or smaller area when compared to an axial cross section of the positioning head 24. In other words, the magnetic insert holding surface 28 has the smallest footprint of the magnetic positioning tool 16 in an axial view thereof, or in a plan view of the magnetic insert holding surface 28.

Attention is again drawn to FIG. 3. For example, the magnetic insert holding surface 28 can have a generally rectangular shape with a pair of opposite major edges 36 which extend in the elongation direction ED and a pair of opposite minor edges 38 (which can be non-straight). The positioning head 24 can include head surfaces 34, each of which extends from a respective major edge 36. The head surfaces 34 diverge away from the magnetic insert holding surface 28. The head surfaces 34 can be planar, and are configured to assist the operator with establishing the correct orientation and indexing position of the current magnetically held miniature insert 14 (especially when the operator is indexing the insert 14).

According to the subject matter of the present application, the magnetic positioning tool 16 can have three magnetic positioning tool embodiments:

According to a first magnetic positioning tool embodiment, the magnetic positioning tool 116 is modular, and can be rigidly attached/reattached to most drivers 42 or tools. Specifically, the rear tool end 122 is configured to be attached, or clamped, onto/into a driver rear end 44 (non-driving end). For example, the rear tool end 122 can include a non-magnetic, non-ferromagnetic coupling portion, or sleeve 40, which is configured to couple or attach the magnetic tool 116 onto another tool, such, e.g., a driver 42.

According to a second magnetic positioning tool embodiment, the magnetic positioning tool 216 has a positioning head 24 which is an integral part of the driver 242, and specifically, of the driver rear end 244 (i.e., non-driving end thereof). The magnetic tool 216 can be, e.g., adhered, forced into a dedicated recess or screw threaded into or onto the driver rear end 44.

According to a third magnetic positioning tool embodiment, the magnetic positioning tool 316 is a stand-alone tool, which is configured only to assist the operator in positioning, holding and indexing the insert 14 as disclosed above. According to this embodiment, the magnetic tool 316 does not include any driving means such as a Torx interface/key. The magnetic positioning tool 316 includes a holding portion 330 at the rear tool end 322.

The undersized insert 14 is typically made from extremely hard and wear-resistant material such as cemented carbide by form-pressing and sintering carbide powders in a binder. The cemented carbide may be, for example, tungsten carbide. The milling insert 14 may be coated or uncoated. The undersized inserts 14 are preferably non-demagnetized. However, during tests, the magnetic positioning tool 16 functioned adequately, and properly held even inserts which were demagnetized.

The undersized insert 14 has opposite insert top and bottom surfaces 48, 50 and an insert peripheral surface 52 which extends therebetween. The insert 14 has a 120-degree rotational symmetry about a symmetry central axis CA which passes through the insert top and bottom surfaces 48, 50. Thus, the insert 14 is three-way indexable about its symmetry central axis CA. The insert 14 has a virtual mid-plane MP which is perpendicular to the central axis CA, located midway between the insert top and bottom surfaces 48, 50 and intersects the insert peripheral surface 52. A maximum insert thickness MIT is measured in a direction parallel to the central axis CA, between outward extremities of the insert top and bottom surfaces 48, 50. The maximum insert thickness MIT preferably ranges between 1.0 and 2.5 millimeters.

The insert top surface 48 has a peripheral top edge 54. The top edge 54 includes exactly three operative portions 56 configured for operating on a workpiece. For example, each operative portion 56 can include, e.g., a main cutting edge 58, a corner cutting edge 60 and/or a ramping cutting edge 62. Each operative portion 56 can include wiper edges 64, which are not configured for removing material, but rather for smoothening, or improving the surface quality of the workpiece.

Each main cutting edge 58 can have a main cutting edge length CEL which ranges between 2 and 4 mm.

The insert top surface 48 includes a top abutment surface 68 configured for abutting engagement with a screw 74 for securing the insert 14 in the pocket 18. Each top abutment surface 68 includes exactly three top abutment sub-surfaces 76.

The insert top surface 48 includes main rake surfaces 70 which can be located between the top edge 54, and the top abutment surface 68. Each main rake surface 70 extends from a respective main cutting edge 58.

According to the present embodiments, in a top, or plan view of the insert top surface 48 the insert 14 can have a non-regular trigon, or a regular triangular shape. An inscribed circle IC is defined between (or tangent to) three identical main cutting edges 58 of the top edge 54. The inscribed circle IC has an inscribed circle diameter ICD which ranges between 2.5 and 3.8 millimeters and preferably is between 2.5 and 3.2.

In most, or all examples, the inscribed circle diameter ICD range leaves no room for a proper, functional clamping bore (capable of accommodating a proper/usable screw with a usable screw head size), while also maintaining an adequate insert structure. In other words, inserts that small, can become too weak and unusable, and/or the clamping bore will only accommodate screws that are too small and unsuitable for securing cutting inserts in pockets. Consequently, these inserts 14 are devoid of a clamping bore, and any other through aperture, and thus are regarded as being "bore-less". Not having a clamping bore is advantageous at least because the insert is more robust, and manufacturing process is cheaper compared to an insert with a bore.

The bottom surface 50 includes a bottom abutment surface 78. The bottom abutment surface 78 is preferably planar. The bottom surface 50 has a bottom edge 80, which can lie in a single plane. The bottom edge 80 is not configured for any type of machining. The insert 14 is therefore single-sided, or one-sided. The bottom surface 50 can include a recess located centrally in the bottom abutment surface 78, which can improve engagement definition (3-points engagement as known in the field) between the bottom abutment surface 78 and a respective abutment surface in the pocket 18.

It is noted, therefore, that an undersized insert 14 may have top and/or bottom surfaces provided with recesses, depressions and other formations, yet still be considered "bore-less", so long as it lacks a through-going bore of sufficient size to permit a clamping element to pass therethrough and secure the insert to an insert pocket.

The insert peripheral surface 52 includes relief surfaces 82, each of which extends from a respective portion of the top edge 54. The relief surfaces 82 converge downwards (with increasing proximity to the central axis CA) towards the bottom edge 80. The insert 14 is therefore defined, as known in the field as a positive insert 14, or as an insert which has a positive cutting geometry.

Attention is drawn to FIGS. 6-10. According to a first insert embodiment, the undersized insert 14 is a high feed milling insert 114 as known in the field. Each operative portion 156 includes a ramping cutting edge 162 connected transversely (in a plan view of the insert top surface 148 as seen in FIG. 10) to a main cutting edge 158 which is connected to a corner cutting edge 160. The operative portion 156 can include a minor corner cutting edge 166 which connects the ramping cutting edge 162 with the main cutting edge 158. Each ramping cutting edge 162 is formed at an intersection between a ramping rake surface 184 and a ramping relief surface 186. Each main cutting edge 158 is formed at an intersection between a main rake surface 170 and a main relief surface 172. The main relief surface 172 is configured for abutment with the insert holding surface 28 of the magnetic positioning tool 16. Each corner cutting edge 160 is formed at an intersection between a corner rake surface 188 and a corner relief surface 190. Each of the rake surfaces is formed on the insert top surface 148. Each of the relief surfaces is formed on the insert peripheral surface 152.

Attention is drawn to FIG. 11-15. According to a second insert embodiment, the undersized insert 14 is a shouldering insert 214 as known in the field. The shouldering insert is configured to form a 90 degree shoulder in the workpiece. Each operative portion 256 includes a main cutting edge 258, a wiper edge 264 and a corner cutting edge 260 which extends therebetween. Each operative portion 256 can also include a ramping cutting edge 262 which extends between the wiper edge 264 and a main cutting edge 258 of an adjacent operative portion 256. Each main cutting edge 258 is formed at an intersection between a main rake surface 270 and a main relief surface 272. Each ramping cutting edge 262 is formed at an intersection between a ramping rake surface 284 and a ramping relief surface 286. Each corner cutting edge 260 is formed at an intersection between a corner rake surface 288 and a corner relief surface 290. Each of the rake surfaces is formed on the top surface 248. Each of the relief surfaces is formed on the insert peripheral surface 252. The peripheral surface 252 further includes wiper relief surfaces 265, each of which extends from a respective wiper edge 264.

In the first and second embodiments, the inscribed circle diameter ICD is 3.0 mm and 2.8 mm respectively.

Figure 11:
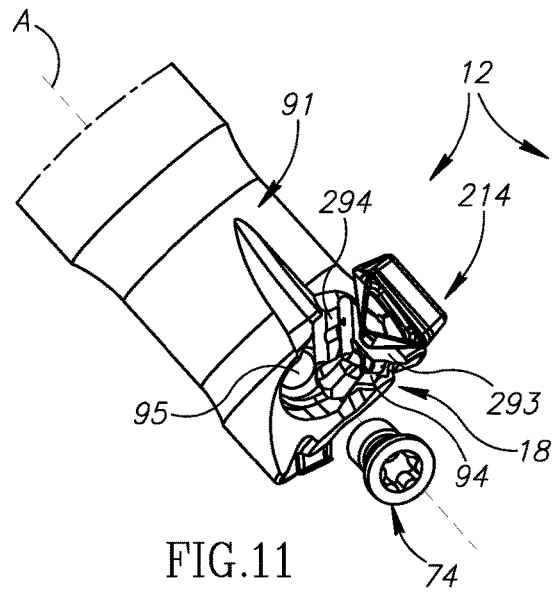
FIG. 11 is an exploded isometric view of a second embodiment of undersized inserts and a milling tool.
Figure 12:
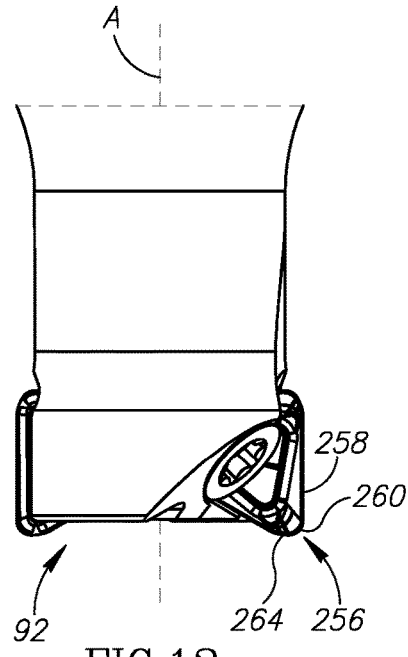
FIG. 12 is a side view of the milling tool of FIG. 11.
Figure 14:
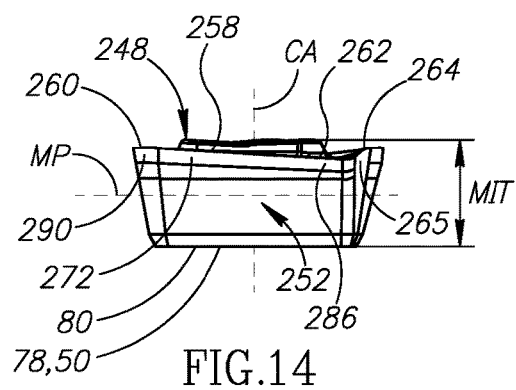
FIG. 14 is a side view of the undersized insert of FIG. 11.
Figure 13:
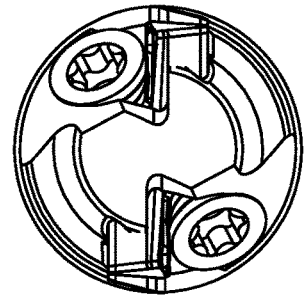
FIG. 13 is an axial view of the milling tool of FIG. 11.
Figure 15:
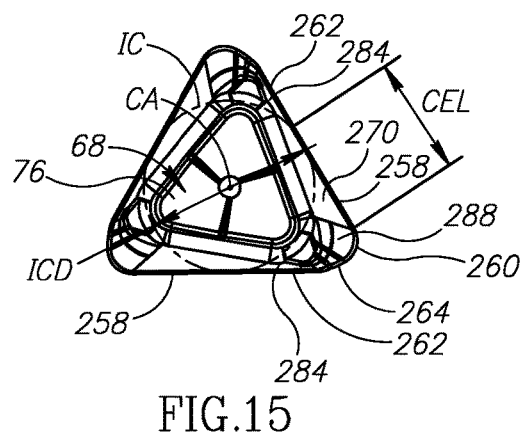
FIG. 15 is a plan view of an insert top surface of the undersized insert of FIG. 6.
Figure 16:
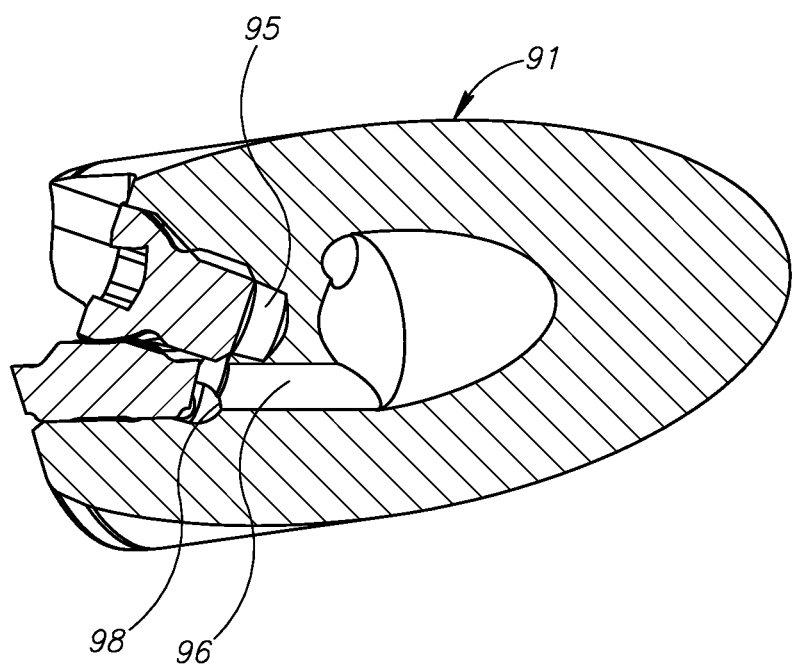
FIG. 16 is a cross-sectional view of a fluid channel taken along line XVI-XVI of FIG. 7.

Attention is drawn to FIGS. 6 and 11. The milling tool 12 has a milling body 91 and a cutting portion 92 which extends therefrom and includes at least two pockets 18. The pocket 18, or pockets are what is known in the field as radially oriented, or radial, pockets 18. The inserts 14 are therefore also referred to radial inserts.

Each pocket 18 can have a pocket base surface 93 and two pocket walls 94 which extend therefrom. The pocket walls 94 can be perpendicular to the pocket base surface 93. According to the first insert 114 embodiment, the two pocket walls 194 converge inwardly, in a direction parallel to the rotation axis A (as seen in FIG. 6). According to the second insert 214 embodiment, the two pocket walls 294 converge inwardly, in a direction perpendicular to the rotation axis A (as seen in FIG. 11).

Each pocket 18 includes a wedge-type arrangement which secures these undersized, bore-less inserts 14. The inserts 14 are not adhered, or brazed in any way to any other portions of the milling tool 12 or adaptor/cartridges of any kind, to ensure a simple, fast and cost-effective replacement or indexing of the inserts 14 themselves (without any adaptors or shims). Each pocket 18 includes a screw 74 which is screw threaded into a threaded bore 95 in the milling tool 12, without passing through the insert 14. The threaded bore 95 is not located in the pocket base surface 93. The screw 74 is configured to directly contact, and force the insert 14 against the pocket base surface 93 (i.e., the insert 14 is wedged therebetween). The screw 74 also pulls the insert 14 towards and against the pocket walls 94 that locate the insert 14 in the pocket 18. When tightened, the screw 74 engages the top abutment surface 68, and specifically, the screw 74 abuts one of the top abutment sub-surfaces 76.

Each pocket 18 can further include an internal fluid channel 96 which extends along the milling body 91, and opens out to the pocket 18 at a fluid outlet 98. The fluid outlet can be located adjacent the threaded bore 95. The fluid channel 96 and the fluid outlet 98 are separate from the threaded bore 95. The fluid channel 96 can be located between two pocket walls 94.

Torque drivers are well known, and are sometimes supplied/recommended for use with the tools of the current field (i.e., miniature milling tools which include tiny screws), since fasteners of said small diameter can rather easily become torn, or broken. These torque drivers include a torque limiting mechanism which is calibrated to prevent the operator from exceeding the recommended torque limit when applying torque to the respective screw size.

A standard/regular driver 42, or torque driver includes opposite driver front and rear ends 43, 44 and a driver body 46 which extends therebetween. The driver 42 has a driver rotation axis DRA. The driver front end 43 includes a key, or torque transferring geometry such as TORX™. The driver body 46 includes a driver holding portion 30 which is configured to provide grip. The driver holding portion 30 can extend radially outwardly away from the driver rotation axis DRA either in one, or two opposite sides thereof.

A method of replacing an undersized insert 14 (usually because all cutting edges have become worn) with the magnetic positioning tool 16 can include the following steps:

a. Attaching the insert holding surface 28 to any part of the undersized insert 14;
b. Unfastening the screw 74 to unclamp, or release, the undersized insert 14;
c. Pulling the insert 14 out of the pocket 18, detaching the insert 14 from the insert holding surface 28 and discarding it;
d. Attaching the insert holding surface 28 to a non-used relief surface 82 of a replacement cutting insert.
e. Inserting the replacement insert 14 into the pocket 18 and fastening the screw 74.

A method of indexing an undersized insert 14 (usually due to a worn cutting edge) with the magnetic positioning tool 16 can include the following steps:

a. Attaching the magnetic holding surface 28 to an exposed, or accessible, main relief surface 72 associated with an operative, usually worn, main cutting edge 25;
b. unscrewing the screw 74 to unclamp, or release, the undersized insert 14;
c. attaching the magnetic tool 16, 116, 216, 316 to the insert 14;
d. removing the insert 14 from the pocket (18) and indexing it such that a non-used main relief surface (72, 172, 272) is attached to the insert holding surface (28);
e. Inserting the undersized insert 14 into the pocket 18 and fastening the screw 74.

What is claimed is:

1. An insert positioning tool (16, 116, 216, 316) configured to retain a bore-less indexable cutting insert (14, 114, 214), the insert positioning tool (16, 116, 216, 316) comprising:
    a tool body (26) having a front and rear tool ends (20, 22);
    a positioning head (24) provided at the front tool end (20) of the tool body (26); and
    an outwardly facing insert holding surface (28) provided on the positioning head (24), wherein:
    the insert holding surface (28) has an elongated shape which corresponds to a shape of a side of the cutting insert (14, 114, 214); and
    the insert holding surface (28) applies an attractive force configured to establish an orientation and retain the cutting insert (14, 114, 214), for positioning the cutting insert in an insert pocket (18) belonging to a cutting tool separate from the insert positioning tool.

2. The positioning tool (16, 116, 216, 316) according to claim 1, wherein:
    the attractive force is a magnetic force;
    the positioning tool is a magnetic positioning tool (16, 116, 216, 316); and
    the insert holding surface (28) is a magnetic insert holding surface (28).

3. The magnetic positioning tool (16, 116, 216, 316) according to claim 2, wherein:
    the magnetic insert holding surface (28) is elongated in an elongation direction (ED); and
    the positioning tool (16, 116, 216, 316) further comprises opposite, enlarged gripping surfaces (32) which extend in the elongation direction (ED) and are configured to provide grip and orientation indication when an operator holds the positioning tool (16, 116, 216, 316).

4. The magnetic positioning tool (16, 116, 216, 316) according to claim 2, wherein:
    the magnetic insert holding surface (28) is elongated in an elongation direction (ED); and
    the magnetic insert holding surface (28) comprises two opposite major edges (36) extending in the elongation direction (ED) and two, shorter, minor edges (38) extending between the major edges (36).

5. The magnetic positioning tool (16, 116, 216, 316) according to claim 2, wherein the tool body (26) is elongated in an axial direction extending away from the positioning head (24), and the magnetic insert holding surface (28) is the outward-most surface which protrudes axially outwardly from the positioning head (24).

6. The magnetic positioning tool (16, 116, 216, 316) according to claim 2, wherein:

the insert (14) is triangular or trigonal, and the magnetic insert holding surface (28) is configured to engage one of three main relief surfaces (72, 172, 272) of the insert (14).

7. The magnetic positioning tool (16, 116, 216, 316) according to claim 2, wherein the magnetic insert holding surface (28) comprises opposite identical major edges (36) which range between 1.8 and 4.2 mm.

8. The magnetic positioning tool (16, 116, 216, 316) according to claim 7, wherein the magnetic insert holding surface (28) comprises opposite minor edges (38) which connect the opposite major edges and range between 1.1 and 2.4 mm.

9. The magnetic positioning tool (16, 116, 216, 316) according to claim 2, wherein the magnetic positioning tool (16, 116, 216, 316) is modular, and the rear tool end (22) of the tool body (26) is configured to be selectively attached to and detached from, a driving tool (42).

10. The magnetic positioning tool (16, 116, 216, 316) according to claim 9, wherein the magnetic positioning tool (16, 116, 216, 316) comprises an elastic sleeve (40) rigidly connected to the positioning head (24).

11. The magnetic positioning tool (16, 116, 216, 316) according to claim 2, wherein:
   the tool body (26) is elongated in an axial direction extending away from the positioning head (24);
   the magnetic insert holding surface (28) is elongated in an elongation direction (ED); and
   in a view along the axial direction, the magnetic insert holding surface (28) has a smaller footprint than a footprint of the tool body (26).

12. The magnetic positioning tool (16, 116, 216, 316) according to claim 2, wherein:
   the positioning head (24) comprises two head surfaces (34) which extend and diverge, rearwardly away from the magnetic insert holding surface (28).

13. The magnetic positioning tool (16, 116, 216, 316) according to claim 2, further comprising:
   a non-ferromagnetic, non-magnetic holding portion (30) rigidly connected to the tool body (26), and configured for enabling grip and applying torque transfer.

14. A milling kit (10) for a milling tool (12) having at least one insert pocket (18), the milling kit (10) comprising:
   the positioning tool (16, 116, 216, 316) according to claim 1; and
   at least one bore-less indexable cutting insert (14) configured to be retained by the positioning tool (16, 116, 216, 316).

15. The milling kit (10) according to claim 14, wherein the cutting insert (14) comprises only three main cutting edges (58) and an inscribed circle (IC) which tangentially contacts all three main cutting edges (58).

16. The milling kit (10) according to claim 15, wherein the inscribed circle (IC) has an inscribed circle diameter (ICD) which ranges between 2.5 mm and 3.8 mm.

17. The milling kit (10) according to claim 15, wherein the inscribed circle (IC) has an inscribed circle diameter (ICD) which ranges between 2.5 mm and 3.2 mm.

18. The milling kit (10) according to claim 14, wherein a shape of the insert holding surface (28) corresponds to a shape of a main relief surface (72, 172, 272) of the cutting insert (14).

19. The milling kit (10) according to claim 14, wherein the cutting insert (14) comprises:
   opposite insert top and bottom surfaces (48, 50) and an insert peripheral surface (52) which extends therebetween;
   a symmetry central axis (CA) passing through the top and bottom surfaces; and
   a maximum insert thickness (MIT), measured along the symmetry central axis (CA), and ranging between 1 mm and 2.5 mm.

20. The milling kit (10) according to claim 14, wherein the milling tool (12) comprises a fluid channel (96) which opens out to the at least one insert pocket (18) at a fluid outlet (98).

21. The milling kit (10) according to claim 14, wherein the cutting insert (14) comprises a main cutting edge (58, 158, 258) having a main cutting edge length (CEL) which ranges between 2 mm and 4 mm.

22. The milling kit (10) according to claim 14, wherein the cutting insert (14) comprises:
   opposite insert top and bottom surfaces (48, 50) and an insert peripheral surface (52) which extends therebetween; and
   a symmetry central axis (CA) passing through the top and bottom surfaces, around which the cutting insert (14) has 120 degree rotational symmetry.

23. The milling kit (10) according to claim 14, further comprising:
   a milling tool (12) having an insert pocket (18) configured and dimensioned to accommodate the cutting insert (14).

24. A method of indexing or replacing a bore-less indexable cutting insert (14) externally secured to an insert pocket (18) of a milling tool (10) by a clamping screw (74), the method comprising:
   a. providing a positioning tool (16, 116, 216, 316) in accordance with claim 1;
   b. contacting an exposed main relief surface (72, 172, 272) of the insert's operative main cutting edge (158, 258), with the positioning tool's insert holding surface (28) to thereby retain the cutting insert (14);
   c. unscrewing the clamping screw (74) to release the cutting insert (14) from the insert pocket (18);
   d. removing the cutting insert (14) from the pocket (18) with the positioning tool and indexing or replacing the cutting insert (14) by hand such that a main relief surface (72, 172, 272) of an unused cutting edge is attached to, and retained by, the positioning tool's insert retaining surface (28);
   e. inserting the indexed or replacement cutting insert (14) into the pocket (18) with the positioning tool; and
   f. fastening the clamping screw (74) to secure the cutting insert (14) to the insert pocket (18).

* * * * *